United States Patent
Suzuki et al.

(10) Patent No.: US 7,036,995 B2
(45) Date of Patent: May 2, 2006

(54) JOINT LOSS MINIMIZING CONNECTION STRUCTURE FOR DISPERSION COMPENSATING OPTICAL FIBER

(75) Inventors: Takaaki Suzuki, Sakura (JP); Shogo Shimizu, Sakura (JP); Kazuhiko Aikawa, Sakura (JP); Kuniharu Himeno, Sakura (JP)

(73) Assignee: Fujikura, Ltd., Tokyo (JP)

( * ) Notice: Subject to any disclaimer, the term of this patent is extended or adjusted under 35 U.S.C. 154(b) by 0 days.

(21) Appl. No.: 10/950,304

(22) Filed: Sep. 23, 2004

(65) Prior Publication Data

US 2005/0041929 A1     Feb. 24, 2005

Related U.S. Application Data

(63) Continuation of application No. 10/114,964, filed on Apr. 1, 2002, now abandoned.

(30) Foreign Application Priority Data

Apr. 3, 2001 (JP) ............................ P2001-104928
Mar. 14, 2002 (JP) ............................ P2002-070833

(51) Int. Cl.
*G02B 6/38* (2006.01)
*G02B 6/255* (2006.01)
*G02B 6/02* (2006.01)
*G02B 6/22* (2006.01)

(52) U.S. Cl. ............................ 385/55; 385/96; 385/126

(58) Field of Classification Search ................ 385/55, 385/95, 96, 123, 126, 127
See application file for complete search history.

(56) References Cited

U.S. PATENT DOCUMENTS

| | | | |
|---|---|---|---|
| 6,470,126 B1 * | 10/2002 | Mukasa | ...................... 385/123 |
| 6,477,306 B1 * | 11/2002 | Kato et al. | .................. 385/123 |
| 6,789,960 B1 | 9/2004 | Bickham et al. | |
| 2002/0057877 A1 * | 5/2002 | Sasaoka et al. | ................ 385/95 |

FOREIGN PATENT DOCUMENTS

| | | |
|---|---|---|
| JP | 62-191806 | 8/1987 |
| JP | 05-215931 | 8/1993 |
| JP | 06-345494 | 12/1994 |
| JP | 08-190030 | 7/1996 |
| JP | 10-039155 | 2/1998 |
| JP | 10-206659 | 8/1998 |
| JP | 10-319266 | 12/1998 |
| JP | 10-325913 | 12/1998 |
| JP | 11-072640 | 3/1999 |
| JP | 2000-338342 | 12/2000 |
| JP | 2002-070833 | 3/2002 |

* cited by examiner

*Primary Examiner*—Chandrika Prasad
(74) *Attorney, Agent, or Firm*—Bell, Boyd & Lloyd LLC

(57) ABSTRACT

In fusion-splicing a dispersion compensating optical fiber having a negative dispersion slope, with a connection optical fiber having a different near field pattern from that of the dispersion compensating optical fiber, if for the connection optical fiber, one is selected such that a theoretical joint loss in a used wavelength, obtained from an overlap integral of a near field pattern of the dispersion compensating optical fiber after fusion splicing and a near field pattern of the connection optical fiber after fusion splicing is presumed to be 0.3 dB or less, in an unconnected state, a construction enabling connection at a low loss results.

24 Claims, 6 Drawing Sheets

JOINT LOSS MINIMIZING CONNECTION STRUCTURE FOR DISPERSION COMPENSATING OPTICAL FIBER

CROSS REFERENCE TO RELATED APPLICATIONS

This patent application is a continuation of U.S. application Ser. No. 10/114,964, filed on Apr. 1, 2002 now abandoned, the disclosure of which is herein incorporated by reference.

BACKGROUND OF THE INVENTION

1. Field of the Invention

The present invention relates to a connection structure between a single-mode optical fiber and a dispersion compensating optical fiber, and more specifically, relates to a connection structure between a single-mode optical fiber and a dispersion compensating optical fiber having a negative dispersion slope.

2. Description of Related Art

A transmission line which combines a single mode optical fiber such as one for use at 1.3 µm and a dispersion compensating optical fiber for compensating the chromatic dispersion thereof, has heretofore been put to practical use.

The single mode optical fiber has a relatively large effective core area (Aeff), and hence nonlinear effects are suppressed. However, if a 1.55 µm band or the like is designated as the wavelength region for use, chromatic dispersion increases. Therefore, a low loss transmission line can be built up by compensating the chromatic dispersion with the dispersion compensating optical fiber.

Japanese Patent No. 2,951,562 discloses a structure for connecting a normal single mode optical fiber and a dispersion compensating optical fiber having a so-called W-type refractive index distribution shape for compensating the chromatic dispersion of the single mode optical fiber, via an intermediate optical fiber interposed therebetween.

In this structure, the mode field diameter of the intermediate optical fiber is made to have substantially the same value as the mode field diameter of the dispersion compensating optical fiber. Also, the mode field diameter of this intermediate optical fiber on the single mode optical fiber side is expanded so as to match the mode field diameter of the single mode optical fiber.

As a result, the joint loss between the intermediate optical fiber, the dispersion compensating optical fiber and the single mode optical fiber is reduced. Expansion of the mode field diameter is performed by heating the end of the intermediate optical fiber to diffuse the dopant such as germanium added to the core thereof.

Recently, with the development of wavelength multiplex transmission, a dispersion compensating optical fiber which can compensate not only the chromatic dispersion of the single mode optical fiber but also the dispersion slope has been developed.

The dispersion slope is an inclination in the graph when the wavelength is plotted on the X-axis and the chromatic dispersion is plotted on the Y-axis, and the normal single mode optical fiber has a positive dispersion slope. Therefore, if the dispersion slope of the single mode optical fiber is compensated by the dispersion compensating optical fiber having a negative dispersion slope, a flat chromatic dispersion characteristic can be obtained in a relatively wide wavelength region.

The normal single mode optical fiber referred to herein is assumed to be one normally used for propagating an optical signal, such as one for use at 1.3 µm and a dispersion shifted optical fiber.

Moreover, the dispersion compensating optical fiber is preferably one capable of single mode propagation.

However, the dispersion compensating optical fiber having such a negative slope has a different refractive index distribution shape from that of the dispersion compensating optical fiber of a type for compensating only the chromatic dispersion which has been heretofore proposed. Hence even if the connection structure is formed based on the mode field diameter as disclosed in Japanese Patent No. 2,951,562, the joint loss cannot be reduced. Particularly, when fusion splicing is performed, there is a tendency for the increase in joint loss to become conspicuous.

As the dispersion compensating optical fiber, there has been provided one having an expanded effective core area, in order to prevent deterioration in the transmission quality due to the nonlinear effect which occurs therein. In this dispersion compensating optical fiber having an expanded effective core area, there is a tendency for the increase in joint loss due to fusion splicing to further increase.

BRIEF SUMMARY OF THE INVENTION

In view of the above problems, it is an object of the present invention to provide a structure which can connect at a low loss a dispersion compensating optical fiber of a dispersion slope compensation type having a negative dispersion slope, with an other optical fiber such as a connection optical fiber.

It is an other object of the present invention to provide a structure which can perform connection at a low loss, in the case where a dispersion compensating optical fiber having a negative dispersion slope is connected to one end of this connection optical fiber, and a single mode optical fiber whose dispersion slope is compensated by the dispersion compensating optical fiber is connected to the other end thereof.

As a result of intensive study by the present inventors to solve the above described problems, it has been found that by using an optical fiber of which the near field pattern after fusion splicing matches with the near field pattern after fusion splicing of the dispersion compensating optical fiber having a negative dispersion slope, the joint loss between this optical fiber and the dispersion compensating optical fiber can be reliably reduced.

That is to say, a first aspect of the present invention is a connection structure for a dispersion compensating optical fiber obtained by fusion-splicing a dispersion compensating optical fiber having a negative dispersion slope with a connection optical fiber having a different near field pattern from that of the dispersion compensating optical fiber, wherein the connection optical fiber has a near field pattern such that a theoretical joint loss in a used wavelength obtained from an overlap integral of a near field pattern of the dispersion compensating optical fiber after fusion splicing and a near field pattern of the connection optical fiber after fusion splicing is 0.3 dB or less, in an unconnected state.

A second aspect of the present invention is that in the connection structure for a dispersion compensating optical fiber, an effective core area of the connection optical fiber in the unconnected state is larger than that of the dispersion compensating optical fiber in the unconnected state.

A third aspect of the present invention is that in the connection structure for a dispersion compensating optical fiber, an expansion rate of an effective core area due to heating of the connection optical fiber is smaller than that of an effective core area due to heating of the dispersion compensating optical fiber.

A fourth aspect of the present invention is that in the connection structure for a dispersion compensating optical fiber, the dispersion compensating optical fiber is connected to one end of the connection optical fiber, and an other end of the connection optical fiber is connected to a single mode optical fiber having a positive dispersion slope which is compensated by the dispersion compensating optical fiber.

A fifth aspect of the present invention is that in the connection structure for a dispersion compensating optical fiber according to the fourth aspect, when an effective core area of the dispersion compensating optical fiber in the unconnected state is designated as A, an effective core area of the connection optical fiber in the unconnected state is designated as B, and an effective core area of the single mode optical fiber in the unconnected state is designated as C, a relation thereof is A<B<C.

A sixth aspect of the present invention is that in the connection structure for a dispersion compensating optical fiber according to either one of the fourth and fifth aspects, when an expansion rate of an effective core area due to heating of the dispersion compensating optical fiber is designated as D, an expansion rate of an effective core area due to heating of the connection optical fiber is designated as E, and an expansion rate of an effective core area due to heating of the single mode optical fiber is designated as F; a relation thereof is F<E<D.

A seventh aspect of the present invention is that in the connection structure for a dispersion compensating optical fiber according to any one of the fourth to the sixth aspects, an effective core area in a used wavelength of the single mode optical fiber is from 100 to 150 $\mu m^2$.

An eighth aspect of the present invention is that in the connection structure for a dispersion compensating optical fiber according to any one of the fourth to the sixth aspects, an effective core area in a used wavelength of the single mode optical fiber is from 55 to 90 $\mu m^2$.

A ninth aspect of the present invention is that in the connection structure for a dispersion compensating optical fiber, the connection optical fiber comprises a core and a cladding provided on a circumference of the core, and fluorine is added to the cladding.

A tenth aspect of the present invention is that in the connection structure for a dispersion compensating optical fiber according to the ninth aspect, the addition of the fluorine is at least 0.6% by weight.

An eleventh aspect of the present invention is that in the connection structure for a dispersion compensating optical fiber according to either one of the ninth and tenth aspects, the cladding comprises at least two layers, and an outermost layer of the cladding comprises pure silica.

A twelfth aspect of the present invention is that in the connection structure for a dispersion compensating optical fiber, the dispersion compensating optical fiber comprises a center core, a side core provided on a circumference of the center core, and a cladding provided on a circumference of the side core, and a refractive index of the center core is higher than that of the cladding, and a refractive index of the side core is lower than that of the cladding.

A thirteenth aspect of the present invention is that in the connection structure for a dispersion compensating optical fiber according to the twelfth aspect, an effective core area in a used wavelength of the dispersion compensating optical fiber is 16 $\mu m^2$ or larger.

A fourteenth aspect of the present invention is that in the connection structure for a dispersion compensating optical fiber according to any one of the first to the eleventh aspects, the dispersion compensating optical fiber comprises a center core, a side core provided on a circumference of the center core, a ring core provided on a circumference of the side core, and a cladding provided on a circumference of the ring core, and a refractive index of the center core and the ring core is respectively higher than that of the cladding, and a refractive index of the side core is lower than that of the cladding.

A fifteenth aspect of the present invention is that in the connection structure for a dispersion compensating optical fiber according to the fourteenth aspect, an effective core area in a used wavelength of the dispersion compensating optical fiber is 18 $\mu m^2$ or larger.

A sixteenth aspect of the present invention is that in the connection structure for a dispersion compensating optical fiber according to the fifteenth aspect, the dispersion compensating optical fiber has characteristics shown in the following (a-1) to (d-1):

(a-1) a chromatic dispersion value in the used wavelength is from −60 to −45 ps/nm/km;

(b-1) a dispersion slope in the used wavelength is from −0.180 to −0.135 ps/nm$^2$/km;

(c-1) the effective core area in the used wavelength is from 20 to 35 $\mu m^2$; and (d-1) a transmission loss in the used wavelength is 0.35 dB/km or less.

A seventeenth aspect of the present invention is that in the connection structure for a dispersion compensating optical fiber according to the fifteenth aspect of the present invention, the dispersion compensating optical fiber has characteristics shown in the following (a-2) to (d-2):

(a-2) a chromatic dispersion value in the used wavelength is from −100 to −80 ps/nm/km;

(b-2) a dispersion slope in the used wavelength is from −0.300 to −0.230 ps/nm$^2$/km;

(c-2) the effective core area in the used wavelength is from 18 to 24 $\mu m^2$; and (d-2) a transmission loss in the used wavelength is 0.40 dB/km or less.

An eighteenth aspect of the present invention is that in the connection structure for a dispersion compensating optical fiber according to the fifteenth aspect of the present invention, the dispersion compensating optical fiber has characteristics shown in the following (a-3) to (d-3):

(a-3) a chromatic dispersion value in the used wavelength is from −45 to −35 ps/nm$^2$/km;

(b-3) a dispersion slope in the used wavelength is from −0.150 to −0.100 ps/nm$^2$/km;

(c-3) the effective core area in the used wavelength is from 26 to 35 $\mu m^2$; and (d-3) a transmission loss in the used wavelength is 0.25 dB/km or less.

A nineteenth aspect of the present invention is a transmission line having the above described connection structure for a dispersion compensating optical fiber.

A twentieth aspect of the present invention is a dispersion compensator having the above described connection structure for a dispersion compensating optical fiber.

A twenty-first aspect of the present invention is a connection method for a dispersion compensating optical fiber for obtaining the above described connection structure for a dispersion compensating optical fiber.

According to the above aspects, by using the connection optical fiber whose near field pattern after fusion splicing is matched, the dispersion compensating optical fiber having a negative dispersion slope can be connected with the connection optical fiber at low loss.

As a result, the dispersion compensating optical fiber can be connected with a single mode optical fiber which is compensated by this dispersion compensating optical fiber via the connection optical fiber, at low loss.

Also in the cladding of the connection optical fiber, the joint loss with a single mode optical fiber having a particularly large effective core area can be reduced, by forming at least a layer adjacent to the core from a fluorine-added silica glass.

DETAILED DESCRIPTION OF THE INVENTION

One example of the present invention will be described below.

In the present invention, for the used wavelength, a suitable wavelength region is preferably selected from 1.53 to 1.63 μm, from the standpoint of transmission characteristics. In the case of performing wavelength multiplex transmission, a relatively wide wavelength region is selected.

Figure 1:
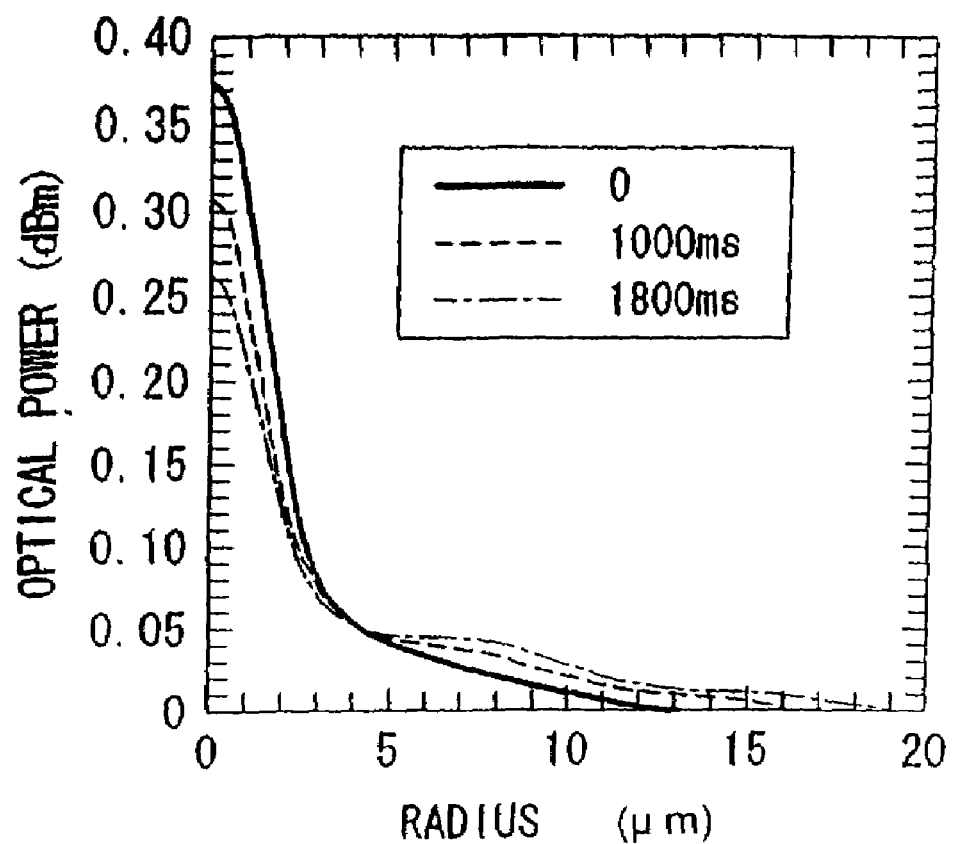
FIG. 1 is a graph showing changes in the near field pattern of a dispersion compensating optical fiber due to heating pursuant to an embodiment of the present invention.

FIG. 1 is a graph showing changes in the near field pattern at the time of fusion splicing of a dispersion compensating optical fiber having a negative dispersion slope. The near field pattern can be measured by a method described in G.650 specified in the ITUT Standard. Specifically, for example, the near field pattern can be obtained by measuring a far field pattern and subjecting this measurement result to an inverse Fourier transform. The near field pattern is expressed by an optical power distribution.

In this graph, the X-axis plots a radius of the optical fiber, and the Y-axis plots the optical power observed at the time of measurement. The scale in the Y-axis is dBm, which is normalized by the optical power.

In the graph, 0, 1000 ms (milli-seconds) and 1800 ms show heating time at the time of fusion splicing. Conditions such as the temperature, other than at the time of heating, are constant. Here 0 shows a near field pattern before fusion splicing.

As shown in this graph, in the dispersion compensating optical fiber having a negative dispersion slope, the near field pattern is easily changed due to heating at the time of fusion splicing.

In the normal optical fiber, such a change in the near field pattern occurs. However, the change in the dispersion compensating optical fiber having the negative dispersion slope is conspicuous.

Figure 2:
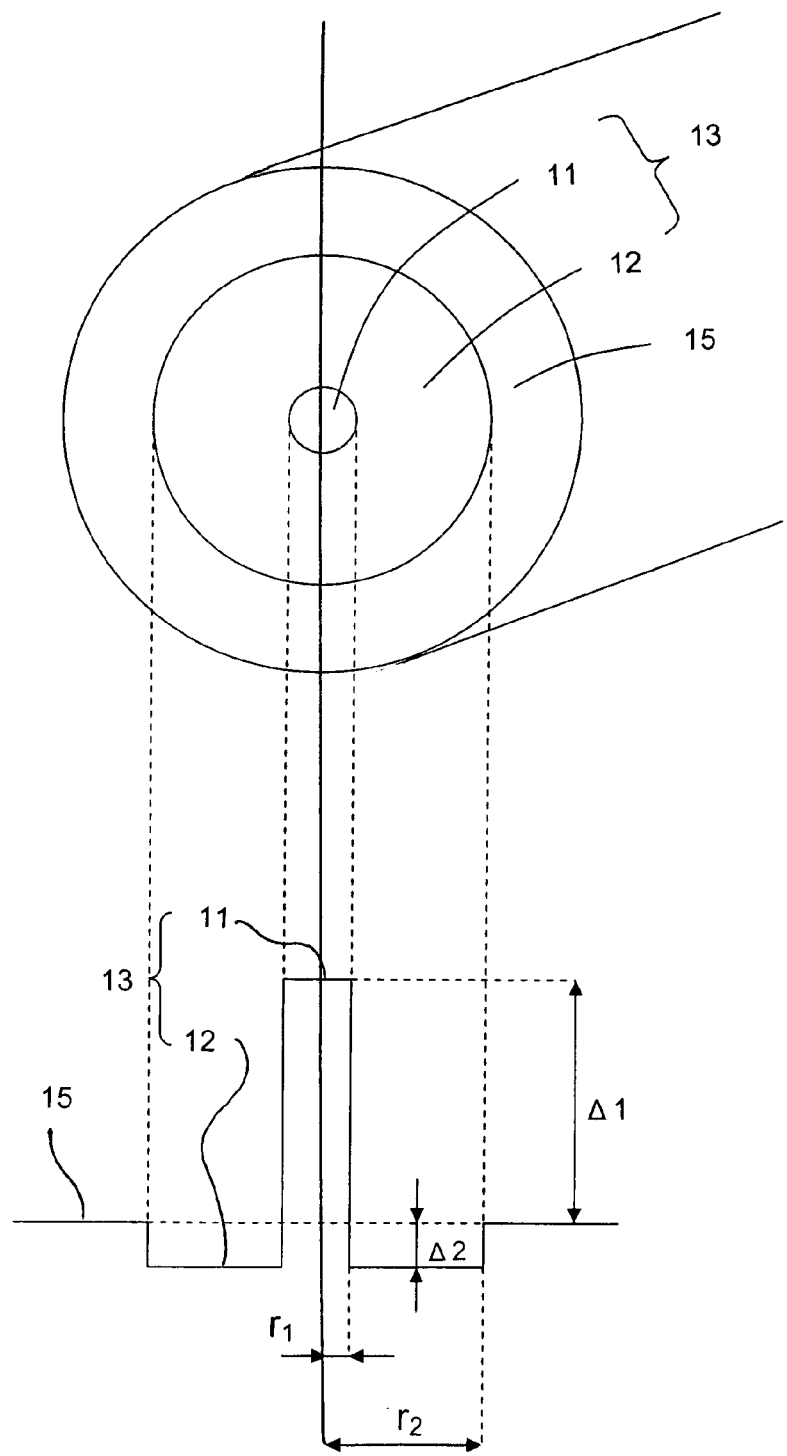
FIG. 2 is a graph and schematic diagram showing a W-type refractive index distribution shape, as one example of a single mode optical fiber suitable for the connection structure according to an embodiment of the present invention.
Figure 3:
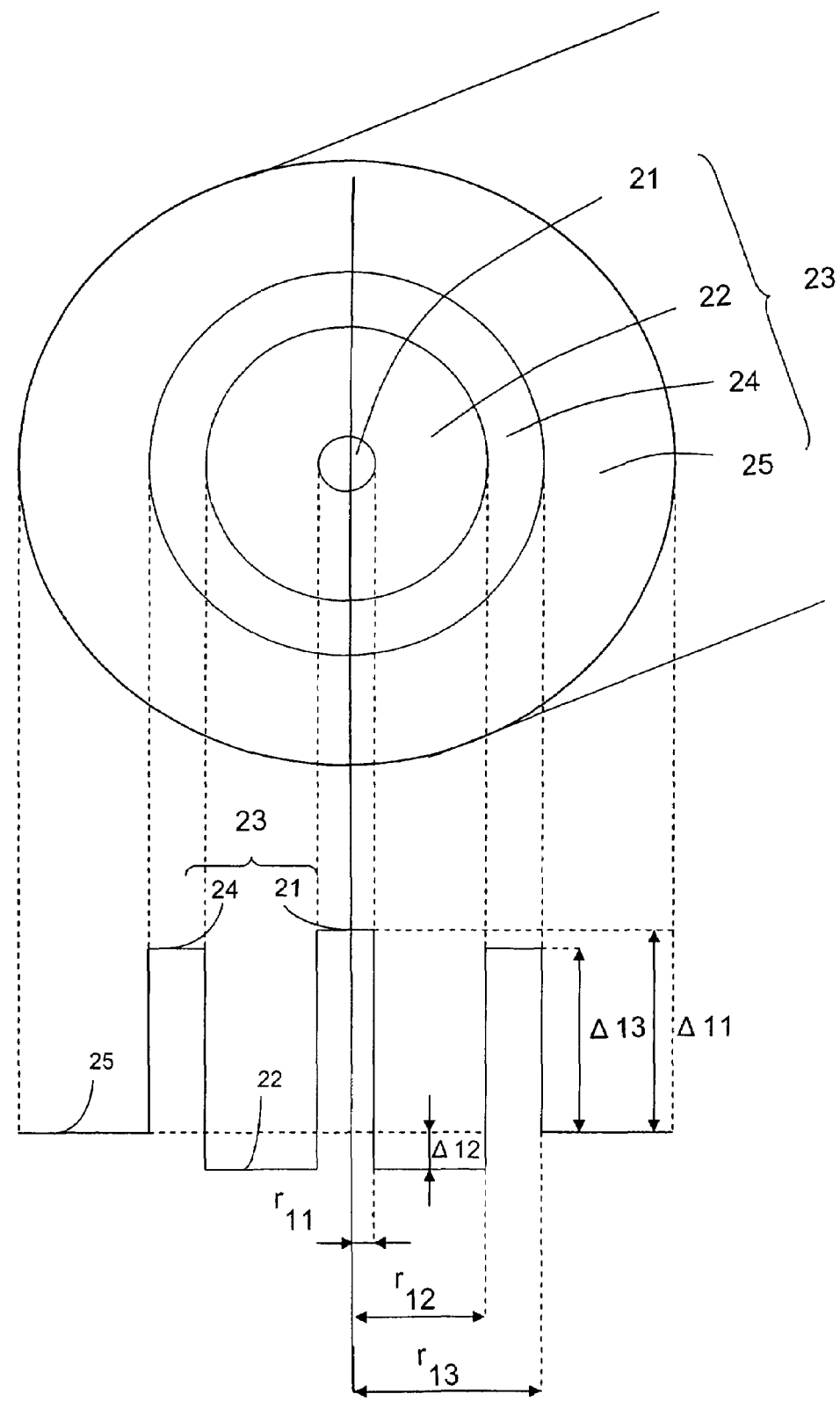
FIG. 3 is a graph and schematic diagram showing a W-type refractive index distribution shape with a segment core, as one example of a dispersion compensating optical fiber suitable for the connection structure according to an embodiment of the present invention.

FIG. 2 and FIG. 3 are explanatory diagrams respectively showing examples of refractive index distribution shapes of dispersion compensating optical fibers having negative dispersion slopes.

FIG. 2 shows a so-called W-type refractive index distribution shape, and in this refractive index distribution shape, a core 13 is formed of a center core 11 provided in a center and a side core 12 provided in a concentric circular shape on the circumference thereof, and a cladding 15 is provided in a concentric circular shape on the circumference of the core.

The relation between refractive indexes of these is such that the refractive index of the center core 11 is higher than that of the cladding 15, and the refractive index of the side core 12 is lower than that of the cladding 15.

The refractive index is adjusted by the addition of a dopant such as germanium having an action of raising the refractive index, or fluorine having an action of lowering the refractive index.

For example, the center core 11 comprises a germanium-added silica glass, the side core 12 comprises a fluorine-added silica glass, and the cladding 15 comprises a pure silica glass or a fluorine-added silica glass.

The dispersion compensating optical fiber having a negative chromatic dispersion and a negative dispersion slope can be obtained by adjusting the relative index difference $\Delta_1$ of the center core 11 based on the cladding 15, the relative index difference $\Delta_2$ of the side core 12 based on the cladding 15, and the ratio between the radius $r_1$ of the center core 11 and the radius $r_2$ of the side core 12.

FIG. 3 shows a so-called W-type refractive index distribution shape with a segment, and this refractive index distribution shape is formed by a core 23 comprising a central center core 21, a side core 22, and a ring core 24 provided in a concentric circular shape in order, and a cladding 25 provided in a concentric circular shape on the circumference thereof.

The refractive index of the center core and the ring core 24 is respectively set higher than that of the cladding 25, and the refractive index of the side core 22 is set lower than that of the cladding 25.

In this example, the refractive index of the ring core 24 is lower than that of the center core 21.

For example, the center core 21 and the ring core 24 comprise a germanium-added silica glass, the side core 22 comprises a fluorine-added silica glass, and the cladding 25 comprises a pure silica glass or a fluorine-added silica glass.

The dispersion compensating optical fiber having a negative chromatic dispersion and a negative dispersion slope can be obtained by adjusting the relative index difference $\Delta_{11}$ of the center core 21 based on the cladding 25, the relative index difference $\Delta_{12}$ of the side core 22 based on the cladding 25, the relative index difference $\Delta_{13}$ of the ring core 24 based on the cladding 25, the ratio between the radius $r_{11}$ of the center core 21 and the radius $r_{12}$ of the side core 22 and the ratio between the radius $r_{11}$ of the center core 21 and the radius $r_{13}$ of the ring core 24.

As a result of the study by the present inventors, in the dispersion compensating optical fiber having a negative dispersion slope, the reason why the change in the near field pattern due to heating is conspicuous is as described below.

A dopant having an action of raising the refractive index, such as germanium, is generally added not only to the dispersion compensating optical fiber having a negative dispersion slope but also to the core of the optical fiber. Since germanium is generally used preferably, the description below will be made taking germanium as an example.

Also, when an optical fiber is drawn from the base material of the fiber, and cooled and solidified, a stress resulting from a difference in the glass transition point of the constituent materials for each layer which constitutes the optical fiber, is frozen in the optical fiber (mainly in the core). This is referred to as residual stress.

Then, if the optical fiber is heated, germanium added to the core diffuses towards the cladding. The residual stress is also released due to softening of the constituent material by heating.

As described above, since germanium has an action of raising the refractive index, the effective refractive index of the core decreases due to the diffusion of germanium. The effective refractive index of the core also decreases due to release of the residual stress. As a result, confinement of light in the core becomes weak, thereby expanding the effective core area and also expanding the near field pattern.

In the dispersion compensating optical fiber having a negative dispersion slope, the relative index differences $\Delta_1$, $\Delta_{11}$ of the center cores 11 and 21 shown in FIGS. 2 and 3 are respectively for example 1.0% or higher, which is relatively high. Therefore, at the time of drawing the optical fiber from the base material of the fiber, it is necessary to suppress an increase in the transmission loss by increasing the drawing tension, and this tension becomes the residual stress. Accordingly, the residual stress increases.

On the circumference of the center cores 11 and 21, there are generally provided side cores 12, 22 added with fluorine. If fluorine is added in a layer adjacent to a layer comprising a germanium-added silica glass, diffusion of germanium is promoted.

Since the large residual stress is released by heating at the time of fusion splicing, and germanium in a relatively large amount is readily diffused, a decrease in the effective refractive index becomes large.

When the effective refractive index of the center cores 11, 21 decreases, confinement of the light in the cores 13, 23 is weakened, thereby expanding the effective core area and the near field pattern outwards of the cores 13, 23, respectively. When heating is continued, and expansion of the near field pattern progresses, and coupling between the propagation mode propagating the cores 13, 23 and the cladding mode occurs, thereby further increasing the joint loss.

Therefore, in the dispersion compensating optical fiber having a negative dispersion slope and the connection optical fiber connected thereto, even in the case where the mode field diameter before the fusion splicing is relatively small, since the near field pattern of the dispersion compensating optical fiber largely changes after the fusion splicing, the joint loss increases.

The present inventors therefore have tried to reduce the joint loss between the dispersion compensating optical fiber having a negative dispersion slope and the connection optical fiber, by matching the near field patterns after fusion splicing, to each other.

As a result, it has been found that even in the case where the dispersion compensating optical fiber and the connection optical fiber having different near field patterns from each other are to be connected, the joint loss can be reduced by matching the near field patterns after fusion splicing, with each other, as described below.

For example, connection at a low loss can be realized by using a connection optical fiber in which the theoretical joint loss obtained from the overlap integral of the near field pattern of the dispersion compensating optical fiber after fusion splicing and the near field pattern of the connection optical fiber after fusion splicing, is presumed to be 0.3 dB or less, and preferably, 0.1 dB or less. If the theoretical joint loss exceeds 0.3 dB, there is a problem in that the joint loss increases. The theoretical joint loss is preferable as small as possible, but from the standpoint of joint loss with the single mode optical fiber described below, which is compensated by the dispersion compensating optical fiber, the theoretical joint loss is substantially 0.05 dB or higher.

The theoretical joint loss can be estimated from the refractive index distribution shape, the diffusion rate of the dopant, and the size of the residual stress. Actually, it is preferable to confirm the theoretical joint loss by performing a preliminary experiment.

The theoretical joint loss can be obtained in the following manner.

At first, one end of the dispersion compensating optical fiber is heated in the unconnected state under the same conditions as at the time of fusion splicing. The connection optical fiber connected to this dispersion compensating optical fiber is similarly heated in the unconnected state.

With respect to the dispersion compensating optical fiber and the connection optical fiber, the power distribution of the light which enters from one end and exits from the other end is measured by a far field pattern measuring device, using a method specified in the above described ITUT Standard, and the measurement result is subjected to an inverse Fourier transform to thereby obtain a near field pattern.

By multiplying the thus obtained near field pattern by ½, the electric field intensity distribution can be obtained.

If the electric field intensity is substituted in expression 1 described below, the theoretical joint loss obtained from the overlap integral of these near field patterns can be calculated.

Generally, if the near field patterns are the same, the theoretical joint loss is zero, and as the near field pattern becomes similar, the theoretical joint loss becomes smaller.

$$-10\log_{10}\frac{\left\{\int E_1(r)E_2(r)rdr\right\}^2}{\int E_1^2(r)rdr\int E_2^2(r)rdr}\text{(dB)} \quad (1)$$

In expression 1, $E_1(r)$ and $E_2(r)$ respectively denote the electric field intensity of the dispersion compensating optical fiber and the connection optical fiber.

As for the near field pattern of the connection optical fiber, a connection optical fiber in which the near field pattern does not change largely due to heating, compared to the near field pattern of the dispersion compensating optical fiber is preferably selected.

In such a connection optical fiber, the conditions for the theoretical joint loss can be easily satisfied, by selecting a connection optical fiber having a near field pattern before fusion splicing which is close to the near field pattern after fusion splicing of the dispersion compensating optical fiber, or a connection optical fiber having a near field pattern slightly smaller than the near field pattern after fusion splicing of the dispersion compensating optical fiber, taking into consideration that the dopant such as germanium added to the core diffuses due to heating to thereby expand the near field pattern slightly.

In order to easily satisfy such conditions for the theoretical joint loss, the dispersion compensating optical fiber and the connection optical fiber preferably satisfy the following conditions.

That is to say, the effective core area of the connection optical fiber in the unconnected state is preferably larger than that of the dispersion compensating optical fiber in the unconnected state.

The difference thereof is, for example, from 1 to 35 $\mu m^2$, and preferably, from 2 to 25 $\mu m^2$. If the difference is less than 1 $\mu m^2$, sufficient effect cannot be obtained, and if the difference exceeds 35 $\mu m^2$, there is the possibility that the joint loss increases.

Also, the expansion rate of the effective core area of the connection optical fiber due to heating is preferably smaller than that of the effective core area of the dispersion compensating optical fiber due to heating. If the connection optical fiber has a larger expansion rate than the dispersion compensating optical fiber, bonding to the cladding mode is likely to occur before the near field patterns are matched, and hence the joint loss tends to increase.

The expansion rate of the effective core area due to heating can be measured in the following manner. That is, the size of the effective core area is obtained by the far field pattern measuring device as described above, using the heating time as a parameter, under a predetermined heating temperature condition.

This expansion rate is preferably such that when values of the expansion rate under certain heating conditions are compared, the ratio of the expansion rate of the dispersion compensating optical fiber to the expansion rate of the connection optical fiber is from 1.1 to 8.0, and more preferably, from 1.2 to 7.0. If it is below 1.1, sufficient effect cannot be obtained, and if it exceeds 8.0, control of the heating time at the time of connection may be difficult.

Since the expansion rate largely depends on the heating conditions (particularly, on the heating temperature), it is necessary to compare values under the same heating conditions.

From the standpoint of reducing the joint loss, it is preferable to use a connection optical fiber in which even if it is heated for a long period of time at the time of fusion splicing, and the dopant such as germanium added to the core diffuses, the propagation mode propagating the core is hardly bonded with the cladding mode. Therefore, it is preferable to select one having a large difference in the propagation constant ($\Delta\beta$) between the propagation mode and the cladding mode. $\Delta\beta$ is set to be, for example, 8000 (rad/m) or larger, and preferably, 9000 (rad/m) or larger.

The connection optical fiber includes one comprising for example a center core, a side core provided on the circumference thereof, and a cladding provided on the circumference of the side core and having a so-called dual type refractive index distribution shape in which the refractive index decreases in order from the center core, the side core and the cladding. In this dual type refractive index distribution shape, for example, the center core and the side core are formed of a germanium-added silica glass or the like. The cladding will be described later.

Since the connection optical fiber is appropriately selected corresponding to the dispersion compensating optical fiber, conditions such as the structural parameters are not particularly limited. However, the relative index difference of the center core based on the cladding is preferably 1.0% or less, and substantially at least 0.5%, from the standpoint of suppressing changes in the near field pattern due to heating.

Also the relative index difference of the side core based on the cladding is preferably from 0.07 to 0.2%, from the standpoint of having a suitable cutoff wavelength, having a suitable near field pattern and reducing bend loss.

Moreover, the ratio of the radius of the side core to the radius of the center core is preferably from 2.5 to 4.0, from the standpoint of having a suitable cutoff wavelength, having a suitable near field pattern and reducing bend loss.

Furthermore, there can be exemplified a connection optical fiber having a refractive index distribution shape similar to that shown in FIG. 3, and comprising a center core, a side core provided on the circumference of the center core, a ring core provided on the circumference of the side core, and a cladding provided on the circumference of the ring core, wherein the refractive index of the center core and the ring core is respectively higher than that of the cladding, and the refractive index of the side core is higher than that of the cladding and lower than that of the center core and the ring core.

In this refractive index distribution shape, for example, the center core and the ring core are formed of a germanium-added silica glass, and the side core comprises a pure silica glass, a germanium-added silica glass, or a fluorine-added silica glass. The cladding will be described later.

Since the connection optical fiber is appropriately selected corresponding to the dispersion compensating optical fiber, conditions such as the structural parameters are not particularly limited. However, the relative index difference of the center core based on the cladding is preferably 1.2% or less, and substantially 0.8% or more, from the standpoint of suppressing changes in the near field pattern due to heating.

Also the relative index difference of the side core based on the cladding is preferably from +0.05 to +0.10%, from the standpoint of having a suitable cutoff wavelength, having a suitable near field pattern and reducing bend loss.

The relative index difference of the ring core based on the cladding is preferably from 0.2 to 0.4%, from the standpoint of having a suitable cutoff wavelength, having a suitable near field pattern and reducing bend loss.

The ratio of the radius of the side core to the radius of the center core is preferably from 3.2 to 3.8, from the standpoint of having a suitable cutoff wavelength, having a suitable near field pattern and reducing bend loss.

Also, the ratio of the radius of the ring core to the radius of the center core is preferably from 4.0 to 5.0, from the standpoint of having a suitable cutoff wavelength, having a suitable near field pattern and reducing bend loss.

The conditions for the fusion splicing between the connection optical fiber and the dispersion compensating optical fiber are not particularly limited, but for example, a temperature of from 1800 to 2300° C. and a period of from 0.8 to 3 seconds are preferable. It is also preferable to perform fusion splicing, while shining light thereon and monitoring the optical characteristic. Values of the expansion rate are compared under the same heating conditions, as described above.

One end of the connection optical fiber is connected to the dispersion compensating optical fiber, but the other end thereof is preferably fusion spliced with a single mode optical fiber having a positive chromatic dispersion and dispersion slope compensated by this dispersion compensating optical fiber. The used length of the connection optical fiber at this time is, for example, 50 cm or more, and preferably not larger than 20 m. If the length is less than 50 cm, the length is not sufficient, and hence the operability of the fusion splice may drop, or light corresponding to the loss occurring at the joint may be combined with the mode propagating the core to cause noise. If the length exceeds 20 m, a problem may occur from the standpoint of the transmission characteristics.

For this single mode optical fiber, there is used one having positive chromatic dispersion and dispersion slope, and having an effective core area of preferably at least 55 $\mu m^2$, and more preferably at least 80 $\mu m^2$, in the used wavelength. Normal single mode optical fibers such as one for use at 1.3 $\mu m$, and a dispersion shifted optical fiber, which have an effective core area of from 55 to 90 $\mu m^2$, may be used, but one having an effective core area of from 100 to 150 $\mu m^2$, and preferably from 120 to 140 $\mu m^2$ is particularly preferable. A single mode optical fiber having an effective core area in this range hardly causes any nonlinear effects, and contributes to an improvement of the transmission characteristics.

A single mode optical fiber having a large effective core area includes an optical fiber having a so-called W-type refractive index distribution shape, which comprises, for example, a center core, a side core provided on the circumference of the center core and having a refractive index lower than that of the center core, and a cladding provided on the circumference of the side core and having a refractive index higher than that of the side core.

In order to expand the effective core area, it is preferable that the relative index difference of the center core based on the cladding is from 0.2 to 0.25%, the relative index difference of the side core based on the cladding is from −0.02 to −0.07%, and the ratio of the diameter of the side core to the diameter of the center core is from 3.5 to 4.5.

Which one of the single mode-optical fiber having an effective core area of from 55 to 90 $\mu m^2$, or the single mode optical fiber having an effective core area of from 100 to 150 $\mu m^2$ is to be used, is appropriately judged, depending on the application thereof and the required characteristics.

In the dispersion compensating optical fiber, the connection optical fiber and the single mode optical fiber, when the effective core area of the dispersion compensating optical fiber in the unconnected state is designated as A, the effective core area of the connection optical fiber in the unconnected state is designated as B, and the effective core area of the single mode optical fiber in the unconnected state is designated as C, the relation thereof is preferably A<B<C.

Also, when the expansion rate of the effective core area due to heating of the dispersion compensating optical fiber is designated as D, the expansion rate of the effective core area due to heating of the connection optical fiber is designated as E, and the expansion rate of the effective core area due to heating of the single mode optical fiber is designated as F, the relation thereof is preferably F<E<D. The measurement method of the expansion rate is as described above. Values of the expansion rate should be compared under the same heating conditions, as described above.

As described above, in order to connect the dispersion compensating optical fiber and the connection optical fiber at a low loss, it is necessary that A<B and E<D. Generally, the relation of A<C is established herein. Therefore, in order to connect the dispersion compensating optical fiber, the connection optical fiber and the single mode optical fiber all at a low loss, it is necessary that B<C and F<E.

The difference between B and C is designated herein as from 15 to 130 $\mu m$, and preferably from 20 to 120 $\mu m^2$. If the difference is less than 15 $\mu m^2$, control of the heating conditions at the time of connection becomes difficult, and if it exceeds 130 $\mu m^2$, the joint loss between the connection optical fiber and the single mode optical fiber may not be reduced sufficiently. Moreover, the ratio of E to F (E/F) is designated as from 2 to 15, and preferably from 2.5 to 10. If the ratio is less than 2, bonding with the cladding mode occurs in the connection optical fiber, before the joint loss between the connection optical fiber and the single mode optical fiber is reduced. Hence, connection at a low loss may not be realized. If the ratio exceeds 15, control of the heating conditions at the time of connection may be difficult.

There is a tendency for the connection optical fiber to have an effective core area similar to that of the dispersion compensating optical fiber, in order to satisfy the above described near field pattern condition, and hence it has a large difference in the effective core area from that of the single mode optical fiber of the nonlinear effect suppression type (effective core area expansion type), as described above. The effective core area of the dispersion compensating optical fiber having a negative dispersion slope is, for example, approximately from 16 to 35 $\mu m^2$.

Therefore, at the time of fusion splicing with the single mode optical fiber, it is desirable that the connection optical fiber be heated for a relatively long period of time to diffuse the dopant such as germanium added to the core as much as possible, to thereby expand the effective core area, in order to reduce the joint loss between the connection optical fiber and the single mode optical fiber.

At this time, in the case where the outer layer adjacent to the core (on the circumference of the core) comprises a fluorine-added silica glass, diffusion of the dopant such as germanium can be promoted, thereby enabling rapid expansion of the effective core area.

The added amount of fluorine is preferably at least 0.6% by weight, and more preferably, from 0.9 to 1.5% by weight. If the amount is less than 0.6% by weight, the diffusion promotion effect cannot be obtained. On the other hand, if it exceeds 1.5% by weight, the near field pattern is likely to change at the time of fusion splicing with the dispersion compensating optical fiber, and hence a problem may occur.

However, if the dopant is added, the melting point of the silica glass decreases. Therefore, there is a problem in that the outer shape of the connection optical fiber may be deformed due to heating for a long period of time.

Hence, it is preferable that the cladding is formed by at least two layers, with the layer adjacent to the core being formed of a fluorine-added silica glass, and the outermost layer being formed of a pure silica glass, so as to promote diffusion of the dopant and prevent deformation of the outer shape.

The outer diameter of each layer constituting the cladding can be appropriately changed by means of the effective core areas of the connection optical fiber and the single mode optical fiber. However, it is generally preferable that the outer diameter of the first layer of the cladding comprising a fluorine-added silica glass, which is adjacent to the core, is generally from 45 to 70 µm, and the outer diameter of the outermost layer of the cladding is about 125 µm.

The heating conditions for fusion splicing and the expansion of the core are not particularly limited, but preferably, for example, a temperature of from 1800 to 2300° C. and a period of from 10 to 30 seconds is preferable.

In the dispersion compensating optical fiber, it is preferable from the standpoint of improving the transmission characteristics that the effective core area is as large as possible.

In the dispersion compensating optical fiber having a W-type refractive index distribution shape as shown in FIG. 2, the effective core area is preferably at least 16 µm$^2$ (substantially not larger than 20 µm$^2$).

In the dispersion compensating optical fiber having a W-type refractive index distribution shape with a segment as shown in FIG. 3 there is a tendency for the effective core area to be expanded more than the dispersion compensating optical fiber having the W-type refractive index distribution shape as described above. The effective core area of this dispersion compensating optical fiber is preferably at least 18 µm$^2$ (substantially not larger than 35 µm$^2$).

Moreover, in the dispersion compensating optical fiber used in the present invention, the value of the dispersion slope changes depending on other characteristics such as the chromatic dispersion and the effective core area Therefore, the value of the dispersion slope is appropriately selected corresponding to the chromatic dispersion and the dispersion slope of the single mode optical fiber to be compensated by this dispersion compensating optical fiber.

Specifically, in the present invention, for example a dispersion compensating optical fiber having characteristics described below is preferably used.

The dispersion compensating optical fiber of a first embodiment has a W-type refractive index distribution shape with a segment as shown in FIG. 3, wherein the chromatic dispersion value is from −60 to −45 ps/nm/km, the dispersion slope is from −0.180 to −0.135 ps/nm$^2$/km, the effective core area is from 20 to 26 µm$^2$, and the transmission loss is not larger than 0.35 dB/km (substantially not smaller than 0.25 dB/km).

This dispersion compensating optical fiber has a large chromatic dispersion value, and as a result, the transmission loss is also small. It has also a characteristic that the dispersion slope and the effective core area are large.

Preferably, $r_{12}/r_{11}$ is from 2.5 to 5.0, $r_{13}/r_{11}$ is from 4.0 to 5.5, $\Delta_{11}$ is from 0.8 to 1.5% $\Delta_{12}$ is from −0.3 to −0.45%, and $\Delta_{13}$ is from 0.4 to 1.0%. It is preferable to combine and select values satisfying the above described preferable characteristics from these numerical ranges.

The dispersion compensating optical fiber in a second embodiment has a W-type refractive index distribution shape with a segment as shown in FIG. 3, wherein the chromatic dispersion value is from −45 to −35 ps/nm/km, the dispersion slope is from −0.150 to −0.100 ps/nm$^2$/km, the effective core area is from 26 to 35 µm$^2$, and the transmission loss is not larger than 0.25 dB/km (substantially not smaller than 0.20 dB/km).

This dispersion compensating optical fiber has a smaller chromatic dispersion value than the chromatic dispersion value of the dispersion compensating optical fiber of a first embodiment, and as a result, the transmission loss is further small. Furthermore, it has also a characteristic that the dispersion slope and the effective core area are further large.

In wavelength multiplex transmission, since it is important that small transmission loss and large effective core area are achieved, the above second embodiment is preferably adopted.

Preferably, $r_{12}/r_{11}$ is from 2.5 to 5.0, $r_{13}/r_{11}$ is from 4.0 to 5.5, $\Delta_{11}$ is from 0.8 to 1.5%, $\Delta_{12}$ is from −0.3 to −0.45%, and $\Delta_{13}$ is from 0.4 to 1.0%. It is preferable to combine and select values satisfying the above described preferable characteristics from these numerical ranges.

The dispersion compensating optical fiber in a third embodiment has a W-type refractive index distribution shape with a segment as shown in FIG. 3, wherein the chromatic dispersion value is from −100 to −80 ps/nm/km, the dispersion slope is from −0.300 to −0.230 ps/nm$^2$/km, the effective core area is from 18 to 24 µm$^2$, and the transmission loss is not larger than 0.40 dB/km (substantially not smaller than 0.31 dB/km).

This dispersion compensating optical fiber has a large chromatic dispersion value, and as a result, the transmission loss is relatively large. Moreover, in this dispersion compensating optical fiber there is a tendency for the dispersion slope and the effective core area to be slightly smaller, compared to the dispersion compensating optical fiber of the first embodiment.

Preferably, $r_{12}/r_{11}$ is from 2.5 to 4.0, $r_{13}/r_{11}$ is from 2.7 to 8.0, $\Delta_{11}$ is from 1.2 to 1.7%, $\Delta_{12}$ is from −0.25 to −0.45%, and $\Delta_{13}$ is from 0.2 to 1.1%. It is preferable to combine and select values satisfying the above described preferable characteristics from these numerical ranges.

Figure 4:
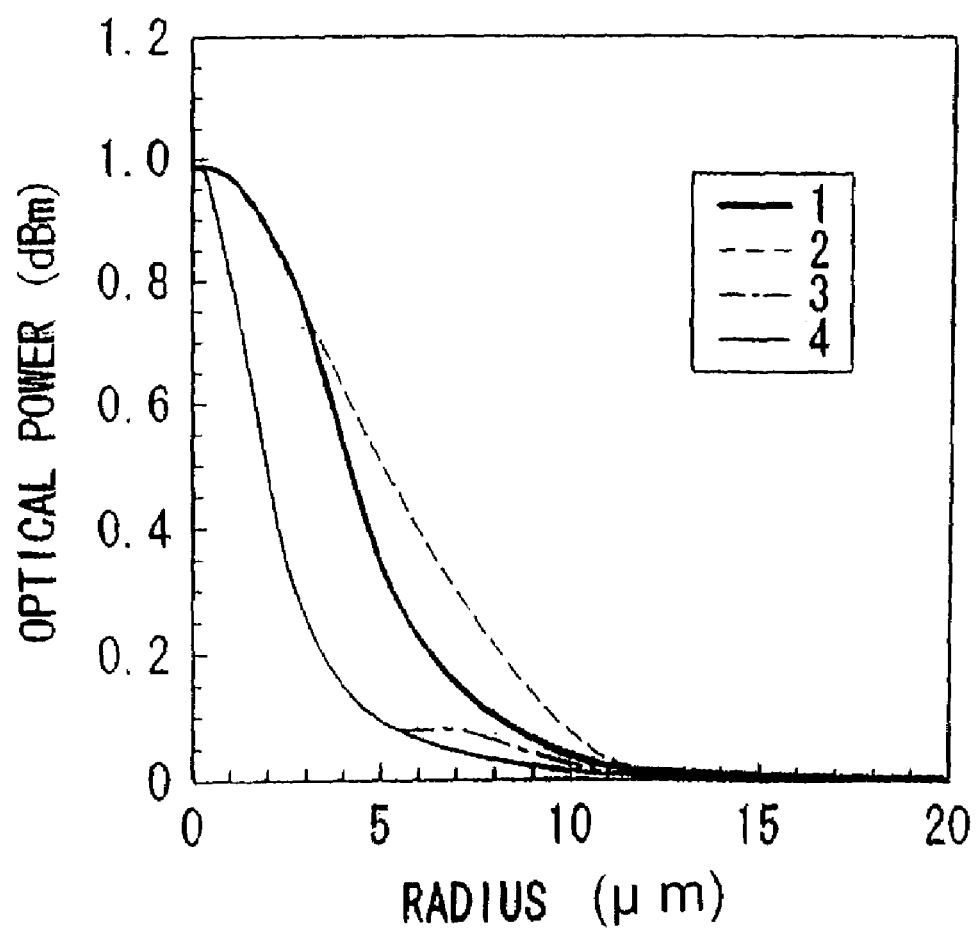
FIG. 4 is a graph showing near field patterns of various optical fibers according to an embodiment of the present invention.
Figure 6:
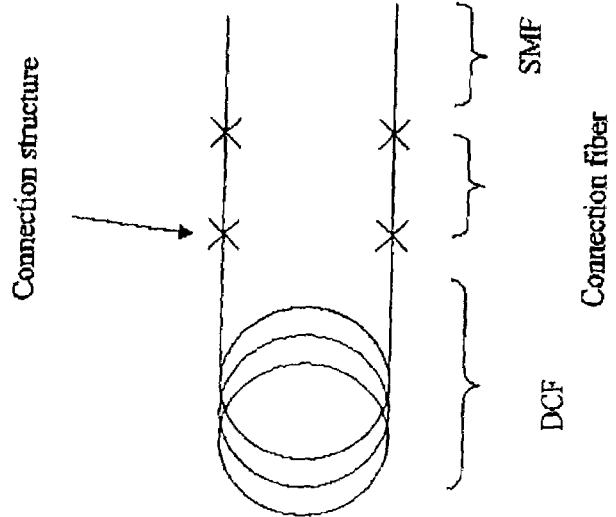
FIG. 6 is a schematic representation of a dispersion compensator having a connection structure for a dispersion compensating optical fiber according to an embodiment of the present invention.
Figure 5:
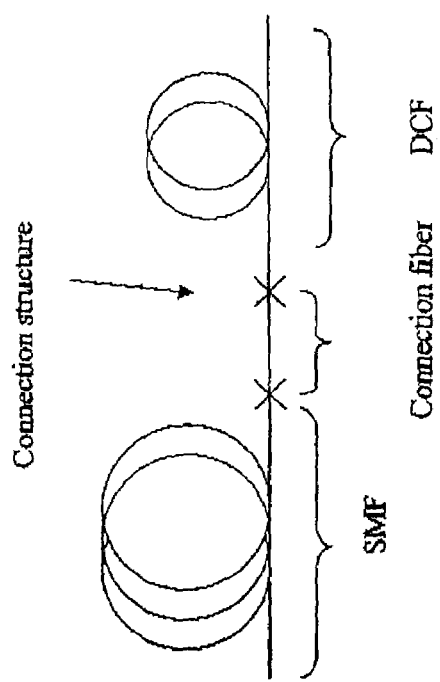
FIG. 5 is a schematic representation of a transmission line having a connection structure for a dispersion compensating optical fiber according to an embodiment of the present invention.
Figure 7:
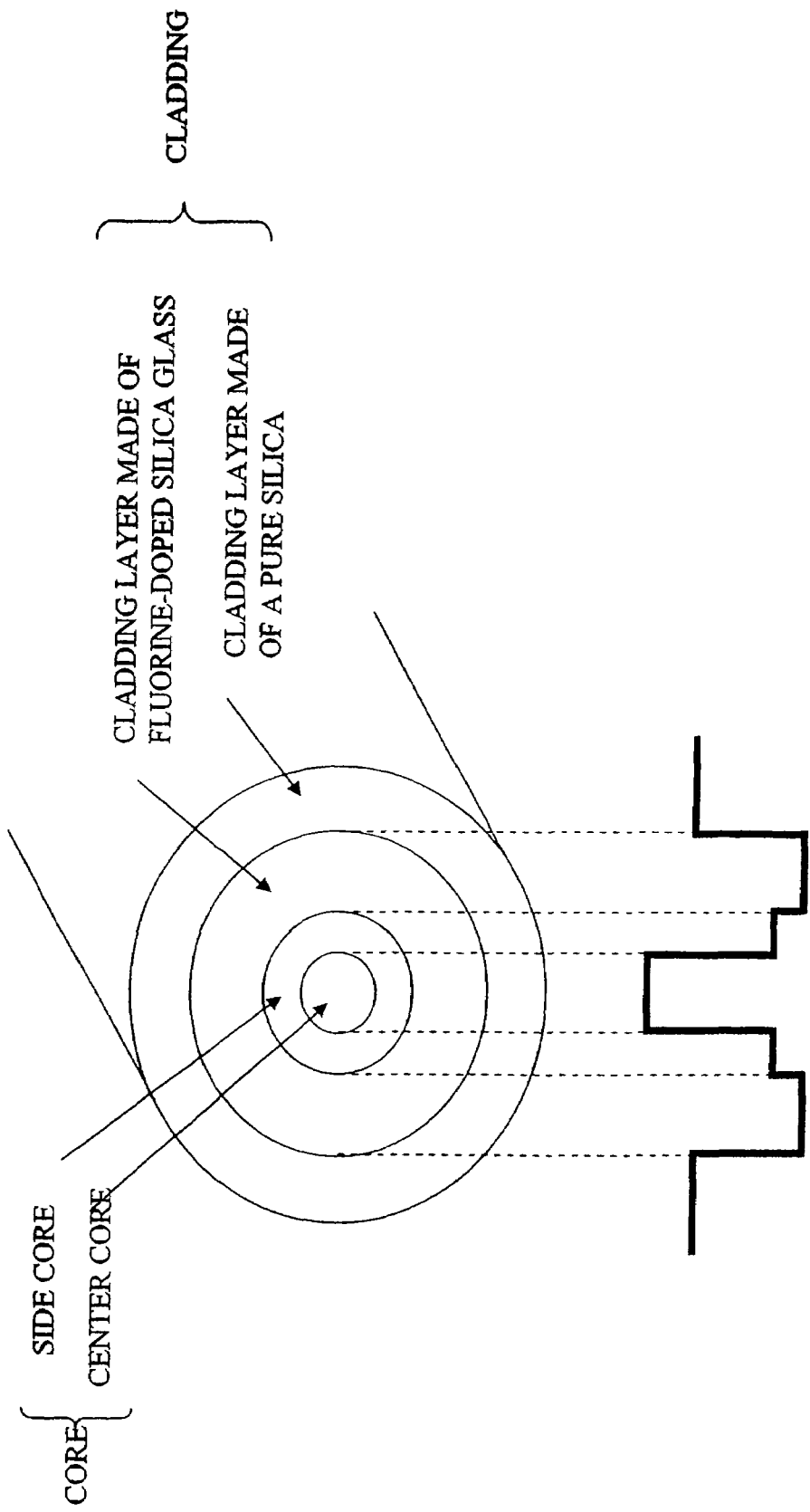
FIG. 7 is a schematic representation of a connection optical fiber pursuant to an embodiment of the present invention.

FIG. 4 is a graph showing an example of a near field pattern of each optical fiber used for the connection structure of the present invention.

No. 1 is a normal single mode optical fiber such as one for use at 1.3 µm (the effective core area being 80 µm$^2$).

No. 2 is a single mode optical fiber having the effective core area of 135 µm$^2$.

No. 3 is a dispersion compensating optical fiber heated under the same conditions as that of the fusion splice.

No. 4 is a near field pattern of a connection optical fiber heated under the same conditions as that of the fusion splice.

The near field patterns of No. 3 and No. 4 coincide well with each other, and the theoretical joint loss in this example is 0.08 dB.

In a transmission line having the connection structure of the present invention, the dispersion compensating optical fiber and the single mode optical fiber can be connected at a low loss via the connection optical fiber, thereby enabling improvement of the transmission characteristics.

The connection structure of the present invention can be also applied to a dispersion compensator.

That is to say, the dispersion compensator is for providing the dispersion compensating optical fiber in a module. For example, this module accommodates the dispersion compensating optical fiber wound in a cylindrical body inside a hexahedron housing or the like.

In the present invention, for example a dispersion compensator can be constructed in such a manner that connection optical fibers as lead fibers are respectively fusion-spliced to the opposite ends of the dispersion compensating optical fiber in a housing, and these lead fibers are respectively pulled out from two holes provided in the housing. By connecting a single mode optical fiber used for a transmission line to these pulled out lead fibers, a low-loss transmission line can be constructed.

The cylindrical body and the housing used for the dispersion compensator are formed of, for example, a metal or ceramics, and the size thereof can be appropriately changed depending on the length of the dispersion compensating optical fiber.

In the transmission line and the dispersion compensator, the dispersion compensating optical fiber, the single mode optical fiber and the connection optical fiber (lead fiber) are used in the form of an optical fiber strand in which a covering layer comprising an ultraviolet hardening-type resin is provided on the circumference of the outermost layer (cladding) consisting of a silica glass, or in the form of an optical fiber core in which a covering layer comprising a nylon or the like is further provided on the circumference of the optical fiber strand.

EXAMPLES

The present invention will now be described in detail by way of examples.

Example 1

A dispersion compensating optical fiber having a negative dispersion slope and a single mode optical fiber compensated by this dispersion compensating optical fiber were fusion-spliced to the opposite ends of a connection optical fiber, and the near field pattern and the joint loss were measured. The used wavelength was 1.55 µm, and the outer diameters of the used optical fibers (outer diameter of cladding) were respectively about 125 µm. Since the expansion rate of the effective core area due to heating largely depends on the heating temperature, the values in this example are shown as reference values. The heating conditions were substantially the same.

The dispersion compensating optical fiber had a W-type refractive index distribution shape with a segment as shown in FIG. 3, and the structural parameters and characteristics thereof were as follows.

The center core and the ring core were made of a germanium-added silica glass, the side core was made of a fluorine-added silica glass, and the cladding was made of a pure silica glass.

$r_{11}$: 1.8 µm
$r_{12}$: 5.8 µm
$r_{13}$: 7.1 µm
$\Delta_{11}$: 1.65%
$\Delta_{12}$: −0.35%
$\Delta_{13}$: 0.5%
Effective core area: 22 µm$^2$
Mode field diameter: 5.3 µm
Chromatic dispersion: −93 ps/nm/km
Dispersion slope: −0.28 ps/nm$^2$/km
Transmission loss: 0.33 dB/km
Cutoff wavelength: 1.7 µm
Expansion rate of the effective core area due to heating: 7.0 µm$^2$/sec The connection optical fiber had a W-type refractive index distribution shape with a segment, and one having a near field pattern different from that of the dispersion compensating optical fiber before fusion splicing was used (theoretical joint loss before fusion splicing was 0.7 dB). The cladding had a one-layer structure, and was formed of a pure silica glass. The structural parameters and characteristics thereof were as follows.

The center core was made of a germanium-added silica glass, the side core was made of a silica glass in which fluorine and germanium were co-added, and the ring core was made of a germanium-added silica glass.

Relative index difference of the center core based on the cladding: 1.3%
Relative index difference of the side core based on the cladding: 0.01%
Relative index difference of the ring core based on the cladding: 0.35%
Radius of the center core: 1.2 µm
Radius of the side core: 8.3 µm
Radius of the ring core: 9.4 µm
Mode field diameter: 6.2 µm
Effective core area: 24.5 µm$^2$
Expansion rate of the effective core area due to heating: 3.0 µm$^2$/sec The single mode optical fiber had a W-type refractive index distribution shape with a segment as shown in FIG. 3, and the structural parameters and characteristics thereof were as follows.

The center core was made of a germanium-added silica glass, the side core was made of a fluorine-added silica glass, and the cladding was made of a pure silica glass.

Relative index difference of the center core based on the cladding: 0.25%
Relative index difference of the side core based on the cladding: −0.05%
Radius of the center core: 6.8 µm
Radius of the side core: 27 µm
Mode field diameter: 12.7 µm
Effective core area: 135 µm$^2$
Chromatic dispersion: 20 ps/nm/km
Dispersion slope: 0.06 ps/nm$^2$/km
Transmission loss: 0.19 dB/km
Cutoff wavelength: 1.6 µm
Expansion rate of the effective core area due to heating: 2.0 µm$^2$/sec A fusion splicing machine was used for connection of the connection optical fiber with the dispersion compensating optical fiber, to heat the connection optical fiber at about 2200° C. for 2 seconds. The mode field diameter of the dispersion compensating optical fiber after fusion splicing was 5.9 µm. The mode field diameter of the connection optical fiber after fusion splicing hardly changed.

A fusion splicing machine was used for connection of the connection optical fiber with the single mode optical fiber, to heat the connection optical fiber at about 2200° C. for 2 seconds for effecting fusion splicing, and thereafter, the end of the connection optical fiber was further heated for 30 seconds to thereby diffuse the germanium.

The theoretical joint loss obtained from the overlap integral of the near field pattern of the dispersion compensating optical fiber and the near field pattern of the connection optical fiber was 0.11 dB. The actual measurement values of the joint loss are shown in Table 1.

Example 1-A

As another single mode fiber, a single mode optical fiber had a step type refractive index distribution shape, and the structural parameters and characteristics thereof were as follows.

Relative index difference of the core based on the cladding: 0.31%
Radius of the core : 4.5 µm
Mode field diameter: 10.1 µm
Effective core area: 83 µm$^2$
Chromatic dispersion: 16.5 ps/nm/km
Dispersion slope: 0.057 ps/nm$^2$/km
Transmission loss: 0.196 dB/km Cutoff wavelength: 1.2 μm
Expansion rate of the effective core area due to heating: 1.1 μm²/sec A fusion splicing machine was used for connection of the connection optical fiber with the single mode optical fiber, to heat the connection optical fiber at about 2200° C. for 2 seconds for effecting fusion splicing, and thereafter, the end of the connection optical fiber was further heated for 20 seconds to thereby diffuse the germanium. The actual measurement values of the joint loss are shown in Table 1.

Example 1-B

As another single mode fiber, a single mode optical fiber had a step type refractive index distribution shape, and the structural parameters and characteristics thereof were as follows.
Relative index difference of the core based on the cladding: 0.33%
Radius of the core: 4.78 μm
Mode field diameter: 10.8 μm
Effective core area: 90 μm²
Chromatic dispersion: 18.2 ps/nm/km
Dispersion slope: 0.06 ps/nm²/km
Transmission loss: 0.196 dB/km
Cutoff wavelength: 1.34 μm
Expansion rate of the effective core area due to heating: 1.1 μm²/sec A fusion splicing machine was used for connection of the connection optical fiber with the single mode optical fiber, to heat the connection optical fiber at about 2200° C. for 2 seconds for effecting fusion splicing, and thereafter, the end of the connection optical fiber was further heated for 25 seconds to thereby diffuse the germanium. The actual measurement values of the joint loss are shown in Table 1.

Example 1-C

As another single mode fiber, a single mode optical fiber had a W-type refractive index distribution shape with a segment, and the structural parameters and characteristics thereof were as follows.
Relative index difference of the center core based on the cladding: 0.5%
Relative index difference of the side core based on the cladding: −0.11%
Relative index difference of the ring core based on the cladding: 0.18%
Radius of the center core: 3.5 μm
Radius of the side core: 5.9 μm
Radius of the ring core: 7.9 μm
Mode field diameter: 8.5 μm
Effective core area: 55 μm²
Chromatic dispersion: 3 ps/nm/km
Dispersion slope: 0.05 ps/nm²/km
Transmission loss: 0.210 dB/km
Cutoff wavelength: 1.25 μm
Expansion rate of the effective core area due to heating: 1.1 μm²/sec A fusion splicing machine was used for connection of the connection optical fiber with the single mode optical fiber, to heat the connection optical fiber at about 2200° C. for 2 seconds for effecting fusion splicing, and thereafter, the end of the connection optical fiber was further heated for 10 seconds to thereby diffuse the germanium. The actual measurement values of the joint loss are shown in Table 1.

Example 2

A dispersion compensating optical fiber having a negative dispersion slope and a single mode optical fiber compensated by this dispersion compensating optical fiber were fusion-spliced to the opposite ends of a connection optical fiber, and the near field pattern and the joint loss were measured. The used wavelength was 1.55 μm, and the outer diameters of the used optical fibers (outer diameter of cladding) were respectively about 125 μm. Since the expansion rate of the effective core area due to heating largely depends on the heating temperature, the values in this example are shown as reference values. The heating conditions were substantially the same.

The dispersion compensating optical fiber had a W-type refractive index distribution shape with a segment as shown in FIG. 3, and the structural parameters and characteristics thereof were as follows.

The center core and the ring core were made of a germanium-added silica glass, the side core was made of a fluorine-added silica glass, and the cladding was made of a fluorine-added silica glass.
$r_{11}$: 2.0 μm
$r_{12}$: 5.7 μm
$r_{13}$: 6.9 μm
$\Delta_{11}$: 0.8%
$\Delta_{12}$: −0.37%
$\Delta_{13}$: 0.4%
Effective core area: 29 μm²
Mode field diameter: 6.1 μm
Chromatic dispersion: −40 ps/nm/km
Dispersion slope: −0.21 ps/nm²/km
Transmission loss: 0.228 dB/km
Cutoff wavelength: 1.5 μm
Expansion rate of the effective core area due to heating: 8.3 μm²/sec The cladding in the connection optical fiber had a two-layer structure, with the first layer adjacent to the core being formed of a silica glass added with fluorine in an amount of 2% by weight and the radius thereof was 25 μm. The outermost layer (the second layer) was formed of a pure silica glass.
Relative index difference of the center core based on the first layer of the cladding: 1.9%
Relative index difference of the side core based on the first layer of the cladding: 0.05%
Relative index difference of the ring core based on the first layer of the cladding: 0.38%
Radius of the center core: 1.9 μm
Radius of the side core: 6.9 μm
Radius of the ring core: 8.5 μm
Mode field diameter: 6.3 μm
Effective core area: 35 μm²
Expansion rate of the effective core area due to heating: 4.3 μm²/sec The single mode optical fiber had a W-type refractive index distribution shape with a segment as shown in FIG. 3, and the structural parameters and characteristics thereof were as follows.

The center core was made of a germanium-added silica glass, the side core was made of a fluorine-added silica glass, and the cladding was made of a pure silica glass.
Relative index difference of the center core based on the cladding: 0.25%
Relative index difference of the side core based on the cladding: −0.05%
Radius of the center core: 6.8 μm Radius of the side core: 27 μm
Mode field diameter: 12.7 μm
Effective core area: 135 μm²
Chromatic dispersion: 20 ps/nm/km
Dispersion slope: 0.06 ps/nm²/km
Transmission loss: 0.19 dB/km
Cutoff wavelength: 1.6 μm
Expansion rate of the effective core area due to heating: 2.0 μm²/sec A fusion splicing machine was used for connection of the connection optical fiber with the dispersion compensating optical fiber, to heat the connection optical fiber at about 2200° C. for 2 seconds. The mode field diameter of the dispersion compensating optical fiber after fusion splicing was 6.4 μm. The mode field diameter of the connection optical fiber after fusion splicing hardly changed.

A fusion splicing machine was used for connection of the connection optical fiber with the single mode optical fiber, to heat the connection optical fiber at about 2200° C. for 2 seconds for effecting fusion splicing, and thereafter, the end of the connection optical fiber was further heated for 30 seconds to thereby diffuse the germanium.

The theoretical joint loss obtained from the overlap integral of the near field pattern of the dispersion compensating optical fiber and the near field pattern of the connection optical fiber was 0.11 dB. The actual measurement values of the joint loss are shown in Table 1.

Example 3

The connection structure was constructed in the same manner as in Example 1, except that the construction of the cladding of the connection optical fiber was changed.

That is to say, the cladding in the connection optical fiber had a two-layer structure, with the first layer adjacent to the core being formed of a silica glass added with fluorine in an amount of 1.2% by weight and the radius thereof was 25 μm. The outermost layer (the second layer) was formed of a pure silica glass.

The structural parameters and characteristics of this connection optical fiber were as follows.
Relative index difference of the center core based on the first layer of the cladding: 1.0%
Relative index difference of the side core based on the first layer of the cladding: 0.05%
Relative index difference of the ring core based on the first layer of the cladding: 0.38%
Radius of the center core: 1.8 μm
Radius of the side core: 6.7 μm
Radius of the ring core: 8.2 μm
Mode field diameter: 5.7 μm
Effective core area : 24.7 μm²
Expansion rate of the effective core area due to heating: 5.6 μm²/sec The mode field diameter of the dispersion compensating optical fiber after fusion splicing was 5.9 μm. The mode field diameter of the connection optical fiber after fusion splicing also changed, and was 5.9 μm.

The theoretical joint loss obtained from the overlap integral of the near field pattern of the dispersion compensating optical fiber and the near field pattern of the connection optical fiber was 0.07 dB. The actual measurement values of the joint loss are shown in Table 1.

Comparative Example 1

A dispersion compensating optical fiber having a negative dispersion slope and a single mode optical fiber compensated by this dispersion compensating optical fiber were fusion-spliced to the opposite ends of a connection optical fiber, in the same manner as in Example 1, and the near field pattern and the joint loss were measured. The used wavelength was 1.55 μm, and the outer diameters of the used optical fibers were respectively about 125 μm.

The dispersion compensating optical fiber had a W-type refractive index distribution shape with a segment as shown in FIG. 3, and the structural parameters and characteristics thereof were as follows.

The center core and the ring core were made of a germanium-added silica glass, the side core was made of a fluorine-added silica glass, and the cladding was made of a pure silica glass.

$r_{11}$: 2.0 μm
$r_{12}$: 5.8 μm
$r_{13}$: 6.8 μm
$\Delta_{11}$: 1.0%
$\Delta_{12}$: −0.4%
$\Delta_{13}$: 0.9%
Effective core area: 26 μm²
Mode field diameter: 6.0 μm
Chromatic dispersion: −54 ps/nm/km
Dispersion slope: −0.15 ps/nm²/km
Transmission loss: 0.3 dB/km
Cutoff wavelength: 1.6 μm
Expansion rate of the effective core area due to heating: 8.5 μm²/sec The connection optical fiber had a step type refractive index distribution shape, and one having a near field pattern different from that of the dispersion compensating optical fiber before fusion splicing was used (theoretical joint loss before fusion splicing was 0.6 dB). The step type is one having a two-layer structure consisting of a core and a cladding provided on the circumference thereof, wherein the refractive index of the core is higher than that of the cladding.

The cladding had a two-layer structure, with the first layer being formed of a fluorine-added silica glass in which fluorine was added in an amount of 0.4% by weight, and the radius thereof was 30 μm. The outermost layer (the second layer) was formed of a pure silica glass.

The structural parameters and characteristics of this connection optical fiber were as follows.
The core was made of a germanium-added silica glass.
Relative index difference of the core based on the first layer of the cladding: 1.0%
Radius of the core: 2.4 μm
Mode field diameter: 6.2 μm
Effective core area: 29 μm²
Expansion rate of the effective core area due to heating: 7.2 μm²/sec A single mode optical fiber the same as in Example 1 was used herein.

The theoretical joint loss obtained from the overlap integral of the near field pattern of the dispersion compensating optical fiber and the near field pattern of the connection optical fiber after the connection was 0.95 dB. The actual measurement values of the joint loss are shown in Table 1.

Comparative Example 2

The connection optical fiber had a step type refractive index distribution shape, and one having a near field pattern different from that of the dispersion compensating optical fiber before fusion splicing was used (theoretical joint loss before fusion splicing was 0.68 dB). The cladding had a two-layer structure, with the first layer being formed of a fluorine-added silica glass in which fluorine was added in an amount of 0.3% by weight, and the radius thereof was 30 μm. The outermost layer (the second layer) was formed of a pure silica glass.

The structural parameters and characteristics of this connection optical fiber were as follows.

The core was made of a germanium-added silica glass.
Relative index difference of the core based on the first layer of the cladding: 1.2%
Radius of the core: 3.0 μm
Mode field diameter: 6.0 μm
Effective core area: 27 μm$^2$
Expansion rate of the effective core area due to heating: 7.1 μm$^2$/sec A dispersion compensating optical fiber and a single mode optical fiber the same as in Comparative Example 1 was used herein.

The theoretical joint loss obtained from the overlap integral of the near field pattern of the dispersion compensating optical fiber and the near field pattern of the connection optical fiber after the connection was 0.90 dB. The actual measurement values of the joint loss are shown in Table 1.

TABLE 1

|  | Total joint loss (dB) | Joint loss with dispersion compensating optical fiber (dB) | Joint loss with single mode optical fiber (dB) |
| --- | --- | --- | --- |
| Example 1 | 0.71 | 0.18 | 0.53 |
| Example 1-A | 0.33 | 0.18 | 0.15 |
| Example 1-B | 0.36 | 0.18 | 0.18 |
| Example 1-C | 0.33 | 0.18 | 0.15 |
| Example 2 | 0.37 | 0.13 | 0.24 |
| Example 3 | 0.38 | 0.14 | 0.24 |
| Com. Ex. 1 | 1.08 | 0.93 | 0.15 |
| Com. Ex. 2 | 1.09 | 0.92 | 0.17 |

Examples 1, 1-A to 1-C, and 2 are compared with Comparative Example 1.

The difference in the mode field diameter between the dispersion compensating optical fiber and the connection optical fiber before fusion splicing in Examples 1, 1-A to 1-C, and 2 was larger than that for Comparative Examples 1 and 2.

However, as the results shown in Table 1, in Examples 1, 1-A to 1-C, and 2, the joint loss could be reduced more than for the Comparative Examples 1 and 2. Particularly, in Examples 2 and 3 where fluorine was added to the cladding respectively, the joint loss with the single mode optical fiber could be reduced considerably. Therefore, it is apparent that it is important to match the near field patterns after fusion splicing with each other, in the connection between the dispersion compensating optical fiber having a negative dispersion slope and the connection optical fiber.

For comparison sake, the dispersion compensating optical fiber and the single mode optical fiber used in each of the Examples and Comparative Examples were directly fusion-spliced. The joint loss thereof had a value exceeding 1.5 dB.

What is claimed is:

1. A connection structure for a dispersion compensating optical fiber obtained by fusion-splicing a dispersion compensating optical fiber having a negative dispersion slope with a connection optical fiber having a different near field pattern from that of the dispersion compensating optical fiber, wherein an effective core area of the connection optical fiber ranges from about 1 to about 35 μm$^2$ greater than an effective core area of the dispersion compensating optical fiber, and wherein said connection optical fiber has a near field pattern so that, at an operational wavelength, a theoretical joint loss calculated from an overlap integral of a simulated near field pattern of said dispersion compensating optical fiber measured by simulating fusion splicing and a simulated near field pattern of said connection optical fiber measured by simulating fusion splicing is 0.3 dB or less.

2. A connection structure for a dispersion compensating optical fiber according to claim 1, wherein an expansion rate of the effective core area due to heating of said connection optical fiber is smaller than that of the effective core area due to heating of said dispersion compensating optical fiber.

3. A connection structure for a dispersion compensating optical fiber according to claim 1, wherein said dispersion compensating optical fiber is connected to one end of said connection optical fiber, and an other end of said connection optical fiber is connected to a single mode optical fiber having a positive dispersion slope which is compensated by said dispersion compensating optical fiber.

4. A connection structure for a dispersion compensating optical fiber according to claim 3, wherein when the effective core area of said dispersion compensating optical fiber is designated as A, an effective core area of said connection optical fiber is designated as B, and the effective core area of said single mode optical fiber is designated as C, a relation thereof is A<B<C.

5. A connection structure for a dispersion compensating optical fiber according to claim 3, wherein when an expansion rate of the effective core area due to heating of said dispersion compensating optical fiber is designated as D, an expansion rate of the effective core area due to heating of said connection optical fiber is designated as E, and an expansion rate of an effective core area due to heating of said single mode optical fiber is designated as F, a relation thereof is F<E<D.

6. A connection structure for a dispersion compensating optical fiber according to claim 3, wherein an effective core area in a used wavelength of said single mode optical fiber is from 100 to 150 μm$^2$.

7. A connection structure for a dispersion compensating optical fiber according to claim 3, wherein an effective core area in a used wavelength of said single mode optical fiber is from 55 to 90 μm$_2$.

8. A connection structure for a dispersion compensating optical fiber according to claim 1, wherein said connection optical fiber comprises a core and a cladding provided on a circumference of said core, and fluorine is added to said cladding.

9. A connection structure for a dispersion compensating optical fiber according to claim 8, wherein the addition of the fluorine is at least 0.6% by weight.

10. A connection structure for a dispersion compensating optical fiber according to claim 8, wherein said cladding comprises at least two layers, and an outermost layer of said cladding comprises pure silica.

11. A connection structure for a dispersion compensating optical fiber according to claim 1, wherein said dispersion compensating optical fiber comprises a center core, a side core provided on a circumference of said center core, and a cladding provided on a circumference of said side core, and wherein a refractive index of said center core is higher than that of said cladding, and a refractive index of said side core is lower than that of said cladding.

12. A connection structure for a dispersion compensating optical fiber according to claim 11, wherein an effective core area in a used wavelength of said dispersion compensating optical fiber is 16 µm² or larger.

13. A connection structure for a dispersion compensating optical fiber according to claim 1, wherein said dispersion compensating optical fiber comprises a center core, a side core provided on a circumference of said center core, a ring core provided on a circumference of said side core, and a cladding provided on a circumference of said ring core, and wherein a refractive index of said center core and said ring core is respectively higher than that of said cladding, and a refractive index of said side core is lower than that of said cladding.

14. A connection structure for a dispersion compensating optical fiber according to claim 13, wherein an effective core area in a used wavelength of said dispersion compensating optical fiber is 18 µm² or larger.

15. A connection structure for a dispersion compensating optical fiber according to claim 14, wherein said dispersion compensating optical fiber has characteristics shown in the following (a-1) to (d-1):
 (a-1) a chromatic dispersion value in the used wavelength is from −60 to −45 ps/nm/km;
 (b-1) a dispersion slope in the used wavelength is from −0.180 to −0.135 ps/nm²/km;
 (c-1) the effective core area in the used wavelength is from 20 to 26 µm²; and
 (d-1) a transmission loss in the used wavelength is 0.35 dB/km or less.

16. A connection structure for a dispersion compensating optical fiber according to claim 14, wherein said dispersion compensating optical fiber has characteristics shown in the following (a-2) to (d-2):
 (a-2) a chromatic dispersion value in the used wavelength is from −100 to −80 ps/nm/km;
 (b-2) a dispersion slope in the used wavelength is from −0.300 to −0.230 ps/nm²/km;
 (c-2) the effective core area in the used wavelength is from 18 to 24 µm²; and
 (d-2) a transmission loss in the used wavelength is 0.40 dB/km or less.

17. A connection structure for a dispersion compensating optical fiber according to claim 14, wherein said dispersion compensating optical fiber has characteristics shown in the following (a-3) to (d-3):
 (a-3) a chromatic dispersion value in the used wavelength is from −45 to −35 ps/nm/km;
 (b-3) a dispersion slope in the used wavelength is from −0.150 to −0.100 ps/nm²/km;
 (c-3) the effective core area in the used wavelength is from 26 to 35 µm²; and
 (d-3) a transmission loss in the used wavelength is 0.25 dB/km or less.

18. A transmission line having a connection structure for a dispersion compensating optical fiber as disclosed in any one of claim 1 through claim 17.

19. A dispersion compensator having a connection structure for a dispersion compensating optical fiber as disclosed in any one of claim 1 through claim 17.

20. A connection method for a dispersion compensating optical fiber for obtaining a connection structure for a dispersion compensating optical fiber as disclosed in any one of claim 1 through claim 17.

21. A connection structure for a dispersion compensating optical fiber according to claim 1 wherein a rate of an expansion rate of the effective core area of the dispersion compensating optical fiber is in a range of 1.1 to 8.0 with reference to an expansion rate of the effective core area of the connection optical fiber under condition that the expansion rates are compared at a constant heating condition.

22. A connection structure for a dispersion compensating optical fiber according to claim 1 wherein a difference in a propagation constant ($\Delta\beta$) between a propagation mode and a cladding mode in the connection optical fiber is 8000 (rad/m) or greater.

23. A method for connecting a dispersion compensating optical fiber comprising the steps of:
 inferring a near field pattern of a connection optical fiber under a post-connected condition and a near field pattern of a dispersion compensating optical fiber under a post-connected condition before the connection optical fiber and the dispersion compensating optical fiber are connected to each other by a fusion splicing operation under condition that the dispersion compensating optical fiber under a pre-connected condition has a negative dispersion slope, and the connection optical fiber under a pre-connected condition has a near field pattern which is different from the near field pattern of the dispersion compensating optical fiber, and an effective core area of the connection optical fiber under a pre-connected condition is greater than an effective core area of the dispersion compensating optical fiber under a pre-connected condition and a difference between the effective core areas ranges from about 1 to about 35 µm²;
 selecting a combination for the dispersion compensating optical fiber and the connection optical fiber such that a theoretical joint loss obtained from an overlap integral of an electric field which is calculated by the inferred near field pattern should be 0.3 dB or smaller; and
 connecting the dispersion compensating optical fiber and the connection optical fiber in accordance with the selected combination.

24. A connection structure for a dispersion compensating optical fiber formed by the method of claim 23.

* * * * *